July 23, 1940.	W. H. HOFFMANN	2,208,979
WHEEL MAKING MACHINE
Filed March 31, 1939	2 Sheets-Sheet 1

INVENTOR
William H. Hoffmann
BY
Harrison, Kennedy & Campbell
ATTORNEYS.

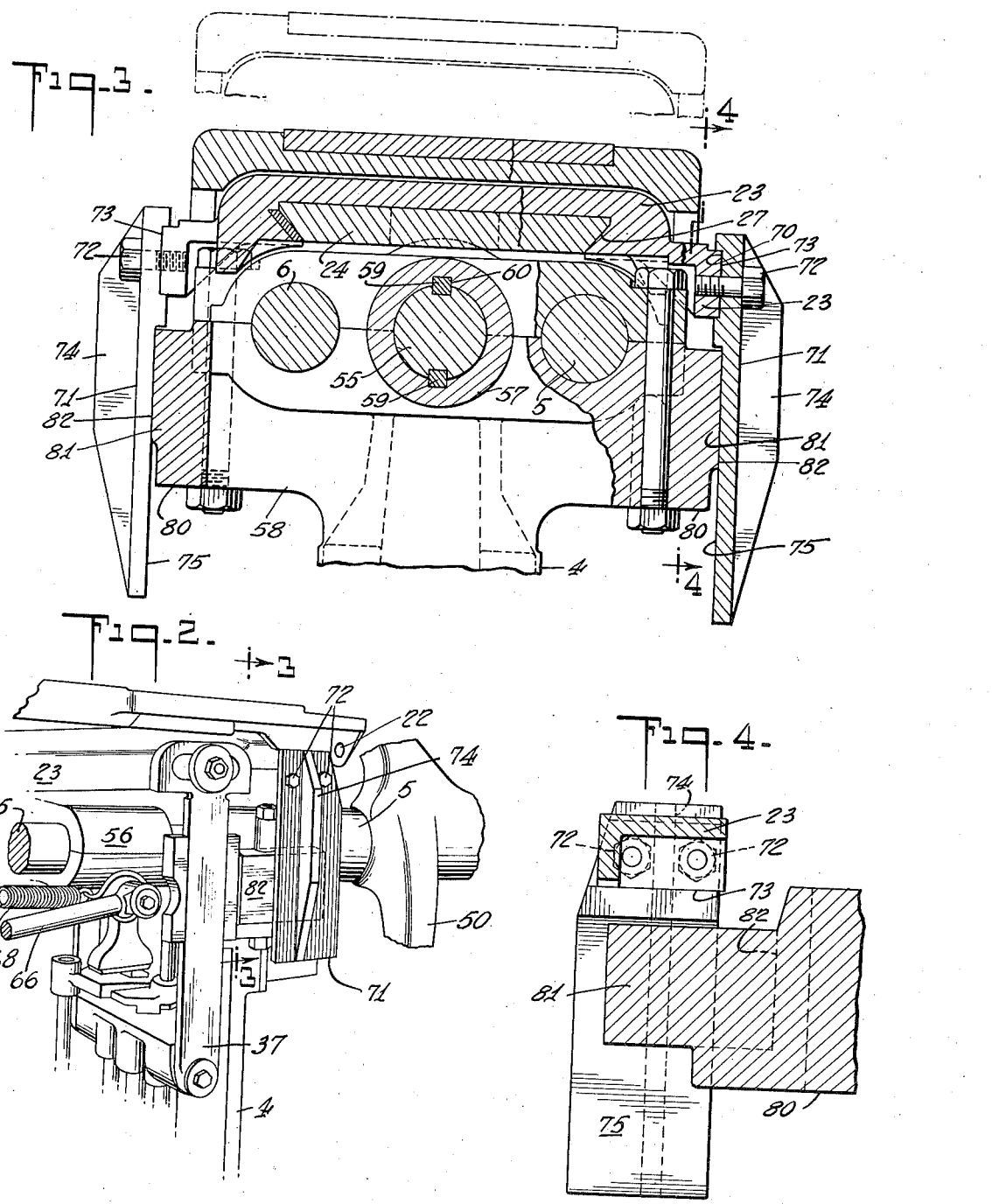

though many features of the present invention are useful in connection with an air pressure operated machine of the type shown in the above patent.

UNITED STATES PATENT OFFICE 2,208,979

WHEEL MAKING MACHINE

William H. Hoffmann, Davenport, Iowa, assignor to French & Hecht, Incorporated, a corporation of Iowa Application March 31, 1939, Serial No. 265,174

5 Claims. (Cl. 78—16)

This invention relates to wheel making machines of the general organization represented in U. S. Letters Patent No. 640,548, wherein a wheel hub and rim to be connected by spokes are supported in the machine in concentric relation to one another and heated spokes inserted through aligned openings in the rim and hub and upset endwise simultaneously to head over the end of the spoke inside the hub and form a shoulder on the spoke to bear against the outer surface of the hub. While the present invention is adapted generally to the form of machine shown in the patent referred to, it finds its particular application in the machine as shown and described in a copending U. S. application Ser. No. 265,204, filed by John H. Ploehn, to which reference may be had for a detailed understanding of the entire machine.

In these machines, the hub and rim are supported on a pivotally mounted gooseneck table, the lower arm of which is adapted to support the hub and rim and the upper arm to carry a clamp for securing the hub in position on the table. The machine is operated pneumatically, its successive operations during each cycle being controlled by valves actuable by a foot treadle. The table, the front end of which is adjustable vertically to different set positions, initially occupies a position with its front end tilted upward for the insertion of a spoke through the openings in the rim and hub, and when the cycle of operation of the machine is inaugurated by a partial depression of the foot treadle, air is exhausted from a table-lifting cylinder, allowing a piston therein to descend and permiting the front end of the table to drop into operative position to lower the hub over a spoke heading tool or header and locate the portion of the spoke outside the hub between a pair of vise jaws. Further depression of the foot treadle effects the admission of air into a cylinder to raise a piston therein for actuating the vise jaws to clamp and hold the spoke against movement during the upsetting operation. After the spoke is clamped between the vise jaws, depression of the foot treadle through the remainder of its downward stroke causes the header inside the hub to move forwardly toward the vise jaws to upset and head over the heated end of the spoke against the inner surface of the hub. At the same time, the table supporting the hub moves in the same direction as the header, but only half as far, causing the portion of the spoke between the outside of the hub and the vise jaws to be upset to form the shoulder, the vise jaws being equipped with dies into which the displaced metal flows and by which it is confined to force it against the outer surface of the hub and mold it to the desired shape. When the upsetting operation is completed, relief of the pressure on the foot treadle permits its return stroke and the machines operates by the exhaust of air from the header and vice jaw actuating cylinders to effect the retraction of the table and header and the opening of the vise jaws to release the spoke, and by the admission of air to the table-lifting cylinder to tilt the front end of the table to its original upper position so that the spoke clears the top edges of the vise jaws. The hub clamp is then released to permit the turning of the hub and rim to the proper position for operation on another spoke. The operation of the machine as just set forth is repeated for each successive spoke.

The vise jaws and header are mounted with respect to the fore and aft center line of the machine, and the header is accurately guided along this line in its forward movement to upset and head over the end of the spoke. If the force exerted in the forward movement of the table to form the shoulder on the spoke should cause the table to twist or move laterally relatively to the center line of the table, it would result in the formation of a defective head and shoulder connection of the spoke with the hub, which is objectionable both from the standpoint of strength and appearance.

It is an object of the present invention, therefore, to prevent the formation of a defective connection of a spoke with the hub resulting from the failure of the table to move in a straight line during the spoke upsetting operation.

It is another object of the invention to guide the table in its movement during the spoke upsetting operation regardless of the vertical position to which the table may be adjusted at the time.

Still another object of the invention is to guide the table in its vertical movement to locate the hub and spoke in operative relation to the header and vise jaws prior to the spoke upsetting operation of the machine.

To this end, and in its broader aspects, the present invention contemplates the provision of means to guide the table relatively to the center line of the machine. More specifically, the table is equipped with side guide plates rigidly secured thereto and presenting each a bearing surface adapted for engagement with a bearing surface or pad formed on a rigid part of the machine frame and being parallel with the center line of the machine. The guide plates are fixed to the table and adapted for movement relatively to the pads formed on the machine frame and, furthermore, the guide plates are formed to engage the pads at all times both during the horizontal and the vertical movements of the table regardless of the set position to which the table may be adjusted.

Referring to the drawings:

Fig. 2 is a fragmentary perspective view of the machine, showing the invention embodied therein;

Fig. 3 is a cross-section taken approximately on the line 3—3 of Fig. 2, looking in the direction of the arrows, some of the parts being broken away to show their construction and relationship; and Fig. 4 is a view taken approximately on the line 4—4 of Fig. 3, looking in the direction of the arrows.

Figure 1:
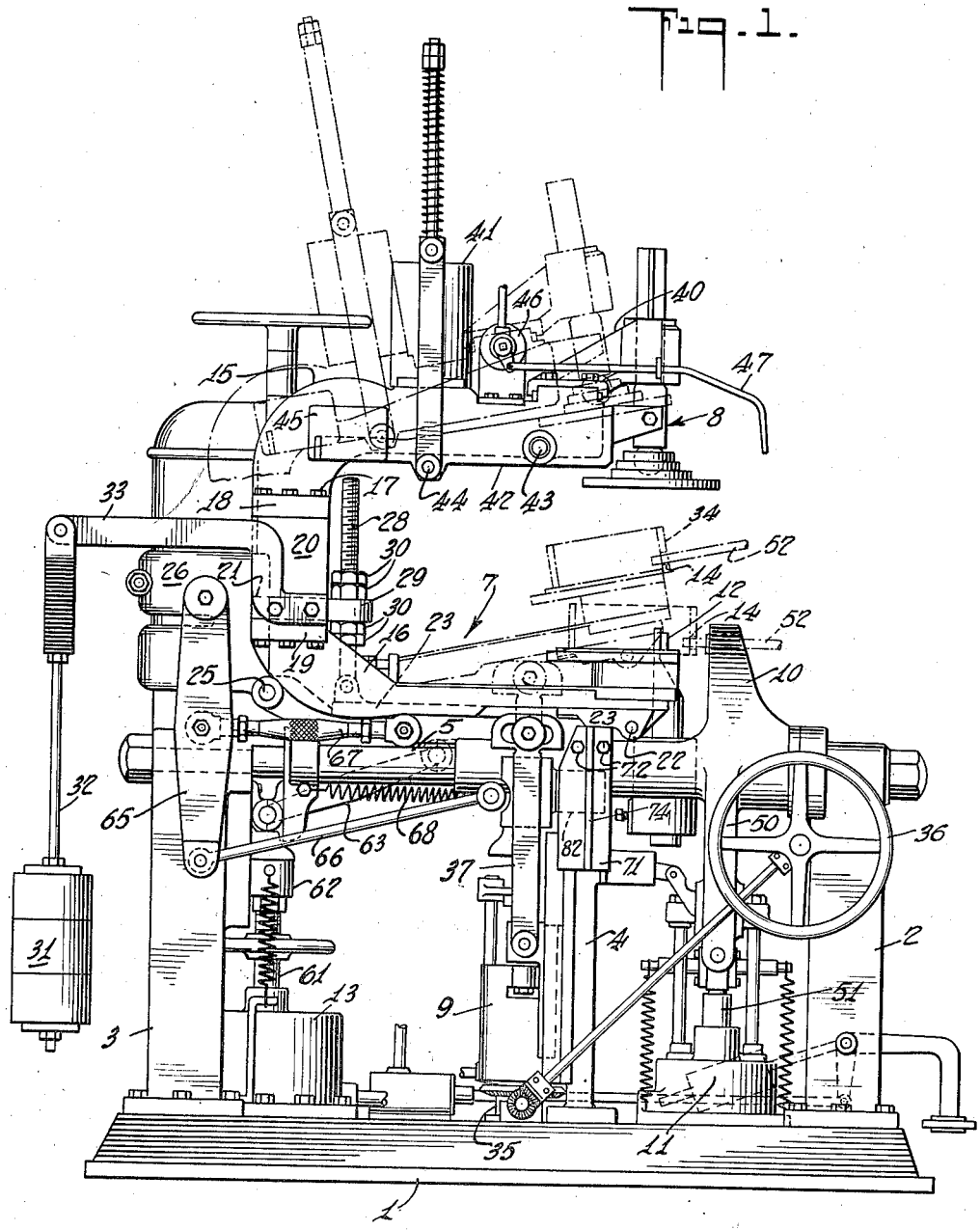
Fig. 1 is a side elevation of the machine, showing by the dot and dash lines the tilted position of the wheel supporting table.

Referring particularly to Figs. 1 and 3, the machine comprises a base 1 on which front, rear and intermediate pedestals 2, 3 and 4, respectively, are mounted and which support two horizontal parallel guide bars 5 and 6 which are circular in cross-section, these parts constituting the main frame of the machine. Mounted in the frame are the three fundamental units of the machine, namely, the work supporting table 7 with its associated hub-clamping ram 8 and lifting cylinder 9, the spoke-clamping vise jaws 10 (one only being shown) and their actuating cylinder 11, and the header 12 and its actuating cylinder 13.

The work supporting table 7 comprises upper and lower arms 15 and 16, respectively, spaced apart vertically at the front and joined together at the rear by bolts 17 passing through flanges 18 and 19 on the upper and lower arms 15 and 16, respectively, and through spacing members 20 and 21 between the ends of the arms, the member 20 being adapted to be replaceable by one of different thickness to vary the vertical distance between the upper and lower arms 15 and 16 when desired. The front end of the lower arm 16 of the table 7 is pivotally mounted on studs 22 at opposite sides of the front end of a slide 23 which is arranged for reciprocation on a plate 24 by which the table unit is pivoted as at 25 to a vertically adjustable collar 26 on the rear pedestal 3, the slide 23 having a dovetail connection 27 with the plate 24, as best seen in Fig. 3. A threaded stud 28 is pivotally connected to the rear end of the slide 23 and adapted to extend upwardly through a slot formed in a forward extension 29 of the spacing member 21, adjusting and lock-nuts 30 being provided on the stud 28 on opposite sides of the extension 29 for raising and lowering the rear end of the table 7 relatively to the slide 23 to adjust the table according to the angle of the spoke openings 14 in the hub 34, the front end of the table rocking about the studs 22 by which it is connected to the slide 23. The weight of the table 7 is counterbalanced by a weight 31 supported at the rear of the machine on a rod 32 pivoted to the end of an arm 33 whose opposite end is secured to the side of the spacing member 21 between the arms 15 and 16 of the table, so that in operation the table lifting and adjusting means are relieved of the burden of overcoming the full weight of the table.

The table 7 and its lifting mechanism as a whole are adapted for adjustment vertically to locate the front end of the table in the proper set position for the particular hub to be operated upon. For this purpose, the table-lifting cylinder 9 is mounted on a low pitch screw jack 35 operable by a hand wheel 36 conveniently located at the front end of the machine. The table-lifting cylinder 9 is mounted for guidance in its vertical movement and is rigidly connected by arms 37 (one only being shown) to the slide 23 of the table 7 to move the latter with it, the low pitch of the threads of the screw jack 35 enabling a very accurate adjustment to be made and causing the jack 35 to act as a positive lock to maintain the table 7 in adjusted position.

The upper arm 15 of the table 7 carries the hub clamping ram 8, which is mounted for reciprocation in a fixed supporting bracket 40 secured to the forward end of the arm, and an air cylinder 41 mounted on the top edge of the arm. The clamping ram 8 is connected to the air cylinder 41 by a double arm lever 42 (one arm only being shown) pivoted to the upper table arm 15 on a pin 43 intermediate the ram 8 and the air cylinder 41 and extending rearwardly beyond its connection 44 with the air cylinder, the free ends of the lever 42 being adapted to support weights 45 to counterbalance the weight of the ram. The ram 8 is actuated by the rise and fall of a piston in the cylinder 41 under the control of a valve 46 operable by the movement of a pull rod 47 extending toward the front of the machine.

Toward the front end of the machine, the air cylinder 11 is mounted on the base 1 between opposed depending arms 50 of the vise jaws 10 (one arm and one jaw only being shown) which arms 50 are rockably mounted each on one of the parallel horizontal guide bars 5 and 6. The lower end of each of the arms 50 is connected to a rod 51 of a piston within the cylinder 11, the arrangement being such that when the piston rises, the lower ends of the arms 50 are forced outwardly in opposite directions to close the vise jaws 10 on a spoke 52 located between them and, upon descent of the piston, the arms 50 are pulled toward one another to open the vise jaws 10 and release the spoke.

The header mechanism comprises a centrally located shaft or header bar 55 (Fig. 3), in which the header 12 is removably mounted, arranged between the guide bars 5 and 6. The front end of the header bar 55 is mounted for reciprocation in a bearing in the front pedestal 2 and its opposite end is removably secured in a slide-block 56 supported on the guide bars 5 and 6 of the frame. Intermediate its ends, the header bar 55 is slidably supported in a bearing 57 in a split crosshead 58 of the intermediate pedestal 4, being held against rotation about its own axis by keys 59 arranged in keyways 60 formed therein and in the bearing 57. The air cylinder 13 located immediately in front of the rear pedestal 3 is equipped with a piston having its piston rod 61 connected to a slide-block 62 mounted for vertical reciprocation in a guideway formed in the front face of the rear pedestal 3, and a connecting link 63 is pivotally secured at one end to the slide-block 62 and at its opposite end to the slide-block 56 which supports the rear end of the header bar 55. When the piston rises in the cylinder 13, forcing the slide-block 62 upwardly, the link 63 is moved toward a horizontal position, thus forcing the slide-block 56 forwardly on the guide bars 5 and 6 and moving the header bar 55 and header 12 with it.

As already stated, during the spoke-upsetting operation the table 7 is moved forwardly half as far as the header bar 55. This is accomplished by pivotally securing the ends of a pair of pendant lever arms 65 (one only being shown) to opposite sides of the collar 26 on the rear pedestal 3 (Fig. 1) and connecting the opposite or lower end of each by a link 66 to one side of the slide-block 56 which supports the rear end of the header bar 55, and also pivotally securing one end of each of a pair of adjustable links 67 substantially midway between the ends of the pendant lever arms 65 and connecting the opposite end of the link to the side of the table slide 23. Thus, when the slide-block 56 supporting the rear end of the header bar 55 moves forwardly, it acts through the connecting links 66 to swing the lever arms 65 counterclockwise, and this movement of the arms 65 acts through the links 67 connecting them with the table slide 23 to move the table in the same direction as the header bar. However, since the links 67 are connected midway between the ends of the lever arms 65, the movement imparted to the table is only half that of the header bar. When air is exhausted from the cylinder 13 and the piston therein descends, the header bar 55 and table 7 are returned to their normal positions by springs 68 secured at one end to the slide-block 56 and having their opposite ends anchored to a fixed part of the machine.

According to the present invention, opposite portions of the side edges of the table slide 23 are accurately machined to provide surfaces 70 (Fig. 3) parallel to the center line of the machine, and heavy guide plates 71 are secured by bolts 72 on opposite sides of the slide, each guide plate 71 being recessed as at 73 and machined accurately to fit over the edge of the slide 23 in interfitting engagement with the surfaces 70. The guide plates 71 are relatively long and wide and are arranged to depend from the sides of the slide 23, being reinforced by ribs 74 on their outer surfaces and having their inner surfaces machined to present bearing surfaces 75 of large area.

The intermediate pedestal 4, which is rigidly secured to the base 1 of the machine and formed at its top end with the split crosshead 58 by which it is connected to the parallel guide bars 5 and 6, is accurately located on the base 1 with respect to the center line of the machine. The crosshead 58 is formed to extend laterally beyond the side edges of the table as at 80 (Fig. 3) and its opposite ends 81 are machined parallel to the center line of the machine to provide large pads 82 adapted to be slidably engaged by the inner bearing surfaces 75 of the guide plates 71 (see also Fig. 2).

With the foregoing arrangement, the guide plates 71, by the sliding engagement of their inner bearing surfaces 75 with the pads 82 on the intermediate pedestal 4, restrain the table 7 against lateral movement or twisting relatively to the center line of the machine. Because of the length of the guide plates 71 and the large area of the pads 82, regardless of the vertical position to which the table 7 may be adjusted at any time, the inner bearing surfaces 75 of the guide plates 71 always remain in engagement with the pads 82 to guide the table 7 throughout the full extent of its reciprocatory movement. Moreover, the guides plates 71 and pads 82 engage throughout the vertical movement of the front end of the table into and out of operative relation to the header 12 and vise jaws 10, thus insuring the accurate location of the spoke in position for the upsetting operation. Hence, the guide plates 71 and pads 82 provide common means for guiding the table 7 both in its vertical and horizontal movements.

In the accompanying drawings, the invention has been shown merely by way of example and in a preferred form characterized by its simplicity and efficiency in operation, but obviously many variations and modifications may be made therein and in its mode of application which will still be comprised within its spirit. For example, the invention is applicable equally as well to machines for making wheel spiders, that is, wheel hubs with spokes fastened therein and to which the rim is secured subsequently. It is to be understood, therefore, that the invention is not limited to any specific form or embodiment, except insofar as such limitations are specified in the appended claims.

Having thus described my invention, what I claim is:

1. In a wheel spoke securing machine, the combination of a hub support, means for mounting the support centered with respect to the center line of the machine and adapted for vertical movement and for horizontal fore and aft movement, means for moving the support vertically and horizontally, and means other than its mounting and its moving means for guiding the support in a straight line in both its vertical and horizontal movements.

2. In a wheel spoke securing machine, the combination of a hub support, means for mounting the support centered with respect to the center line of the machine and adapted for vertical movement and for horizontal fore and aft movement, means for moving the support vertically and horizontally, and common means other than its mounting and its moving means for guiding the support in a straight line in both its vertical and horizontal movements.

3. In a wheel spoke securing machine, the combination of a frame member, machined pads formed on the frame member having surfaces parallel with the center line of the machine, a hub support mounted in the machine for horizontal fore and aft movement, and guide plates fixed to opposite sides of the hub support and arranged for sliding engagement with said pads to guide the support in a straight line during its fore and aft movement.

4. A combination as in claim 3, wherein the hub support is movable vertically and the guide plates are formed to remain in engagement with the pads in different vertical positions of the support.

5. In a wheel spoke securing machine, the combination of a pair of spoke clamping vise jaws mounted with respect to the center line of the machine, a hub support mounted with respect to the center line of the machine and adapted for vertical movement to present a spoke between the vise jaws and fore and aft horizontal movement to upset the spoke to form a shoulder thereon, a fixed frame member having pads machined parallel with the center line of the machine, and guide plates fixed to opposite sides of the support and adapted for sliding engagement with said pads to guide the support in a straight line during both its vertical and horizontal movements.

WILLIAM H. HOFFMANN.